United States Patent
Itou et al.

(10) Patent No.: US 10,328,582 B2
(45) Date of Patent: Jun. 25, 2019

(54) PROCESS SYSTEM INCLUDING ROBOT THAT TRANSFERS WORKPIECE TO PROCESS MACHINE

(71) Applicant: FANUC CORPORATION, Yamanashi (JP)

(72) Inventors: Daisuke Itou, Yamanashi (JP); Takashi Nagatomi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/865,879

(22) Filed: Jan. 9, 2018

(65) Prior Publication Data

US 2018/0207804 A1    Jul. 26, 2018

(30) Foreign Application Priority Data

Jan. 20, 2017    (JP) .................................. 2017-008373

(51) Int. Cl.
*B25J 9/16*        (2006.01)
*B25J 13/08*       (2006.01)
*B25J 9/10*        (2006.01)
*G05B 11/01*       (2006.01)
*G05B 19/418*      (2006.01)

(52) U.S. Cl.
CPC ........... *B25J 13/088* (2013.01); *B25J 9/1005* (2013.01); *B25J 9/1612* (2013.01); *G05B 11/011* (2013.01); *G05B 11/017* (2013.01); *G05B 19/41825* (2013.01); *G05B 2219/39105* (2013.01); *G05B 2219/39561* (2013.01); *G05B 2219/40014* (2013.01); *Y02P 90/087* (2015.11)

(58) Field of Classification Search
CPC ...... B25J 9/1005; B25J 9/1612; B25J 13/088; G05B 11/011; G05B 11/017; G05B 19/41825; G05B 2219/39105; G05B 2219/39561; G05B 2219/40014; Y02P 90/087

See application file for complete search history.

(56) References Cited

U.S. PATENT DOCUMENTS

2014/0297022 A1*  10/2014  Uenishi ................ G05B 19/404
                                              700/160
2015/0045950 A1*  2/2015   Kobayashi ............. B25J 9/1697
                                              700/253

FOREIGN PATENT DOCUMENTS

| JP | H6-99382 A     | 4/1994  |
| JP | 2003-231078 A  | 8/2003  |
| JP | 2003-326486 A  | 11/2003 |
| JP | 2004-106079 A  | 4/2004  |

\* cited by examiner

*Primary Examiner* — Dale Moyer
(74) *Attorney, Agent, or Firm* — Hauptman Ham, LLP

(57) ABSTRACT

A process system includes a detection device that detects a rotation angle of a workpiece when a robot grips the workpiece. The control device includes a storage unit that stores a reference rotation angle serving as a criterion for the rotation angle of the workpiece, and an error calculation unit that calculates a rotation error relative to the reference rotation angle in the rotation angle of the workpiece detected by the detection device. The control device corrects the rotation angle of the fixture based on the rotation error so as to correspond to the rotation angle of the workpiece detected by the detection device when the robot transfers the workpiece to the fixture.

6 Claims, 7 Drawing Sheets

PROCESS SYSTEM INCLUDING ROBOT THAT TRANSFERS WORKPIECE TO PROCESS MACHINE

RELATED APPLICATIONS

The present application claims priority to Japanese Patent Application No. 2017-008373filed on Jan. 20, 2017, the disclosure of which is hereby incorporated by reference herein in its entirety.

BACKGROUND OF THE INVENTION

1. Field of the Invention

The present invention relates to a process system including a robot that transfers a workpiece to a process machine.

2. Description of the Related Art

It is generally known that a workpiece is machined by a process machine such as a machine tool in a factory or the like for manufacturing an article. Moreover, a process system that includes the process machine and a robot that transfers the workpiece to the process machine is known.

When the workpiece is transferred to a position where the workpiece is to be gripped by the robot, the workpiece may not be oriented in a desired direction (at a desired rotation angle) relative to a hand. Furthermore, when the robot grips the workpiece, the gripping position of the workpiece relative to the hand may be displaced. In these cases, the robot which is not gripping the workpiece at a desired rotation angle and a desired position may not place the workpiece at the desired position and the desired rotation angle in a process machine. For this reason, after the robot grips the workpiece, it may be necessary to adjust the position and the rotation angle of the workpiece to the position and the rotation angle for installation to the process machine.

In the related art, it is known that the position and the orientation of a robot are changed according to a displacement amount of the workpiece position relative to the hand and then the workpiece is transferred to the process machine (For example, see Japanese Unexamined Patent Publication No. 2004-106079).

SUMMARY OF THE INVENTION

When the rotation angle of the workpiece gripped by the robot is deviated relative to the hand, the position and the orientation of the robot are corrected. Under such control, the rotation angle of the workpiece may not be correctable. For example, a deviation amount of the rotation angle of the workpiece may exceed the range of motion of the robot. Moreover, when the rotation angle of the workpiece is corrected, the robot may interfere with other members. For example, when the robot corrects the rotation angle of the workpiece, a robot arm may come into contact with the process machine.

In order to correct the rotation angle of a workpiece gripped by a robot, a workpiece phase-matching device can be used so as to adjust the rotation angle of the workpiece or a temporary placement table can be used so as to temporarily place the workpiece. However, when the phase-matching device or the temporary placement table is used, a device for matching the rotation angle of the workpiece to a desired value. Furthermore, it takes a long time to match the rotation angle of the workpiece to the desired value.

A process system according to an aspect of the present disclosure is provided with a process machine that includes a fixture for fixing a workpiece and a robot that transfers the workpiece to the fixture. The process system includes a control device that controls the process machine and the robot. The process system includes a detection device that detects the rotation angle of the workpiece around a predetermined axis line when the robot grips the workpiece. The process machine includes a drive device that rotates the fixture. The control device includes a storage unit that stores a reference rotation angle serving as a criterion for the rotation angle of the workpiece, and an error calculation unit that calculates a rotation error relative to the reference rotation angle in the rotation angle of the workpiece detected by the detection device. The control device corrects the rotation angle of the fixture based on the rotation error so as to correspond to the rotation angle of the workpiece detected by the detection device when the robot transfers the workpiece to the fixture.

DETAILED DESCRIPTION

Referring to FIGS. 1 to 12, a process system according to an embodiment will be described below. The process system according to the present embodiment includes a process machine that machines a workpiece and a robot that transfers the workpiece to the process machine. In the present embodiment, a machine tool will be described as an example of the process machine.

Figure 1:
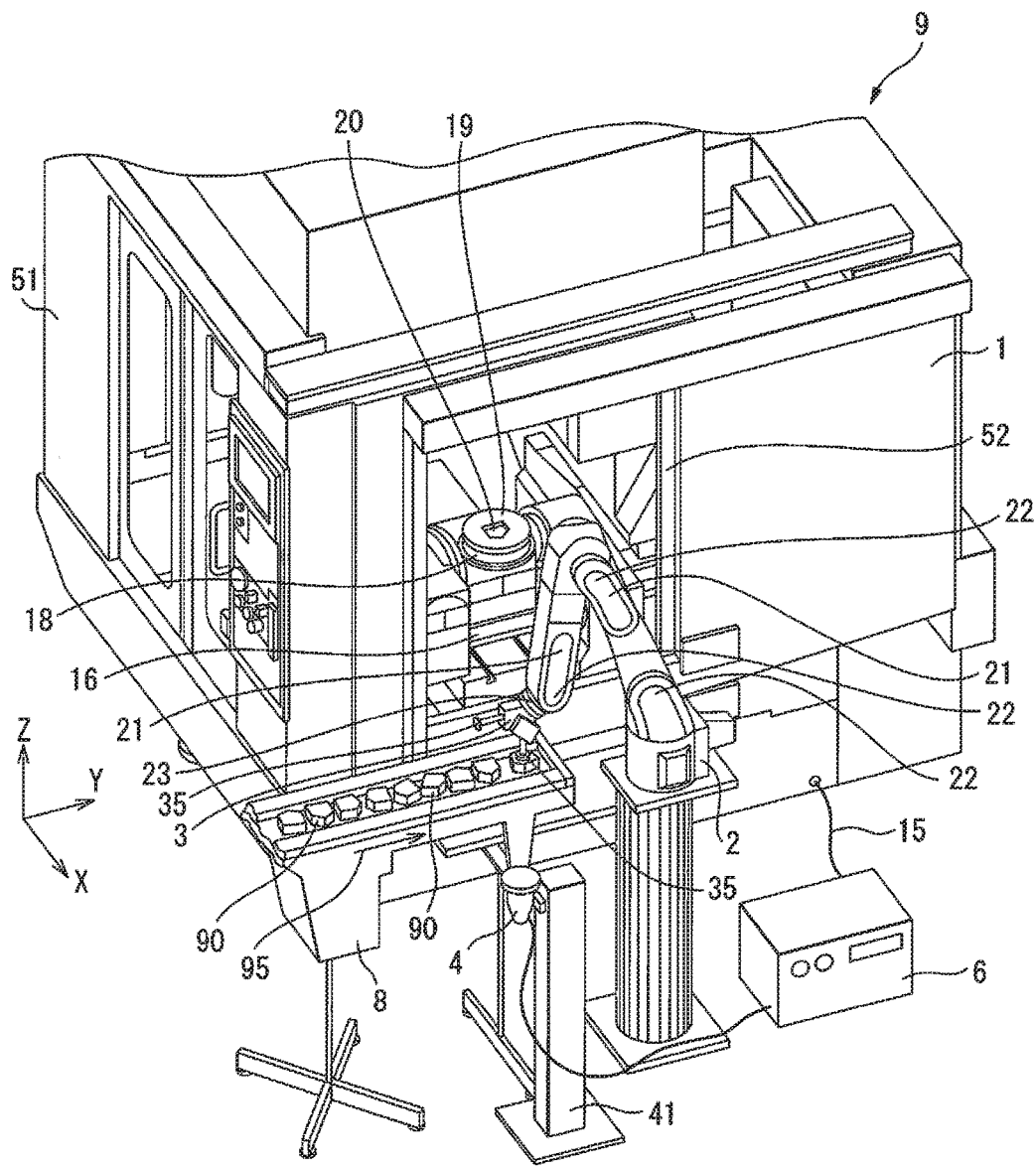
FIG. 1 is a perspective view showing a process system according to an embodiment.

FIG. 1 is a schematic perspective view showing the process system according to the embodiment. In a process system 9 according to the present embodiment, a workpiece 90 to be machined by a machine tool 1 are changed by a robot 2. The process system 9 includes the robot 2 and a hand 3. The robot 2 of the present embodiment is an articulated robot that includes a plurality of arms 21 and a plurality of joint parts 22. A wrist part 23 is connected to the distal end of the arm 21 via the joint part 22. The hand 3 is fixed as an end effector to the wrist part 23. The robot 2 can change the position and the orientation of the hand 3. The robot 2 is not limited to an articulated robot. The robot 2 can be any robot that can transfer the workpiece to the process machine.

The hand 3 is formed so as to grip and release the workpiece 90. The hand 3 of the present embodiment includes two suction pads 35 that suction the workpiece 90. The first suction pad 35 grips the workpiece 90 before machining. The second suction pad 35 grips the machined workpiece 90 that is disposed on a fixture 19 of the machine tool 1. After the machined workpiece 90 is gripped by the second suction pad 35, the wrist part 23 is rotated. Subsequently, the workpiece 90 gripped by the first suction pad 35 before machining can be disposed on the fixture 19 of the machine tool 1.

The end effector is not limited to this configuration. The end effector can be any device that is capable of gripping a workpiece. For example, an end effector that suctions a workpiece via a sponge or an end effector that holds a workpiece with fingers may be employed.

The machine tool 1 of the present embodiment is numerically controlled. Specifically, the machine tool 1 can automatically machine the workpiece 90 based on a machining program that is prepared in advance. The machine tool 1 has a door 52 that is disposed on one side of a frame 51. The door 52 is formed so as to open and close. In a machining room that is surrounded by the frame 51, a spindle head to which a tool is attached and a rotary table 18 that supports the workpiece 90 are arranged.

Figure 2:
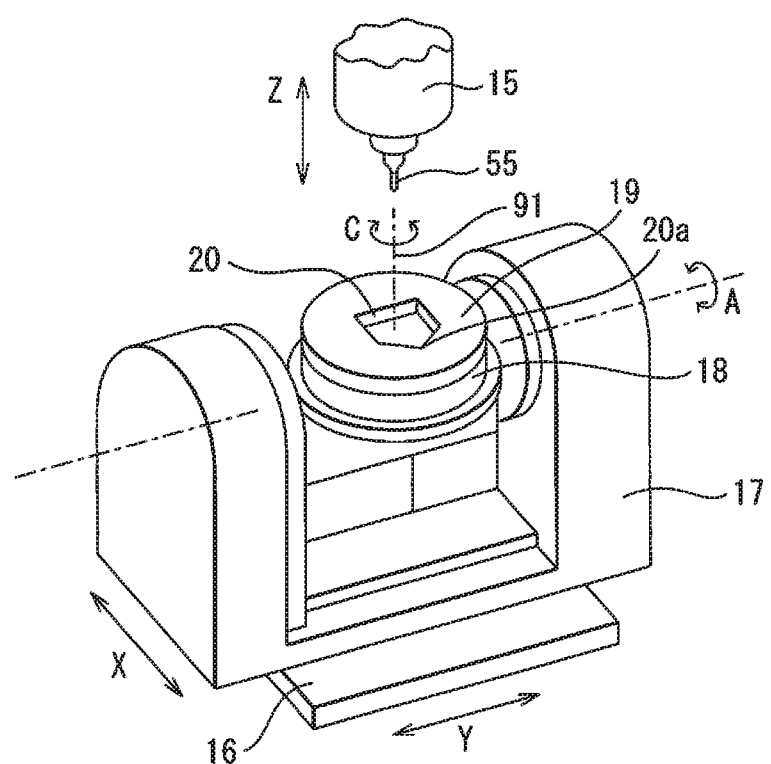
FIG. 2 is a perspective view showing the principal part of a machine tool according to the embodiment.

FIG. 2 is a perspective view showing a principal part of the machine tool according to the present embodiment. Referring to FIGS. 1 and 2, the machine tool 1 includes a table 16 and a rotary table 18 that is supported by the table 16 via a support member 17. The rotary table 18 rotates about an axis line 91. A fixture 19 to which the workpiece 90 is fixed is secured to the rotary table 18. The fixture 19 has a recess portion 20 that corresponds to the shape of the workpiece 90. The workpiece 90 of the present embodiment is disposed in the recess portion 20. The fixture is not limited to this configuration and can be any member for fixing a workpiece.

The workpiece 90 is supported by the rotary table 18 via the fixture 19. The machine tool 1 includes a spindle head 15 that rotates a tool 55. The spindle head 15 is formed so as to rotate the tool about the central axis of the tool 55.

During the machining of a workpiece, at least one of the spindle head 15 and the table 16 is moved so as to change a relative position of the tool 55 with respect to the workpiece 90. The rotary table 18 is rotated so as to change the relative position of the tool 55 with respect to the workpiece 90. Subsequently, the workpiece 90 is machined into a desired shape.

The machine tool 1 of the present embodiment has three linear-motion axes orthogonal to one another and a rotation axis around the axis line 91 of a C axis. In the machine tool 1 of the present embodiment, the X-axis, the Y-axis, and the Z-axis are set as the linear-motion axes orthogonal to one another. The table 16 of the present embodiment is formed so as to move along the X-axis and the Y-axis. The spindle head 15 is formed so as to move along the Z-axis.

The robot 2 of the present embodiment places the workpiece 90 on the fixture 19 before machining, and then removes the workpiece 90 from the fixture 19 after machining. In a period during which the workpieces are changed, the door 52 is opened. The robot 2 can insert the arm 21 into the machining room from an opening and perform an operation in the machining room.

A visual sensor 4 of the present embodiment is a two-dimensional visual sensor. The visual sensor 4 is supported by a pedestal 41. The visual sensor 4 is located such that an image of the workpiece 90 gripped by the robot 2 can be captured from below. The visual sensor 4 is not limited to this configuration and can be located so as to capture the image of the workpiece 90 transferred by a conveyor 8 or the workpiece 90 gripped by the hand 3. Moreover, the visual sensor 4 of the present embodiment is supported by the pedestal 41 so as to be fixed and is not limited to this configuration. For example, the visual sensor may be fixed to the wrist part or the arm of the robot.

Figure 3:
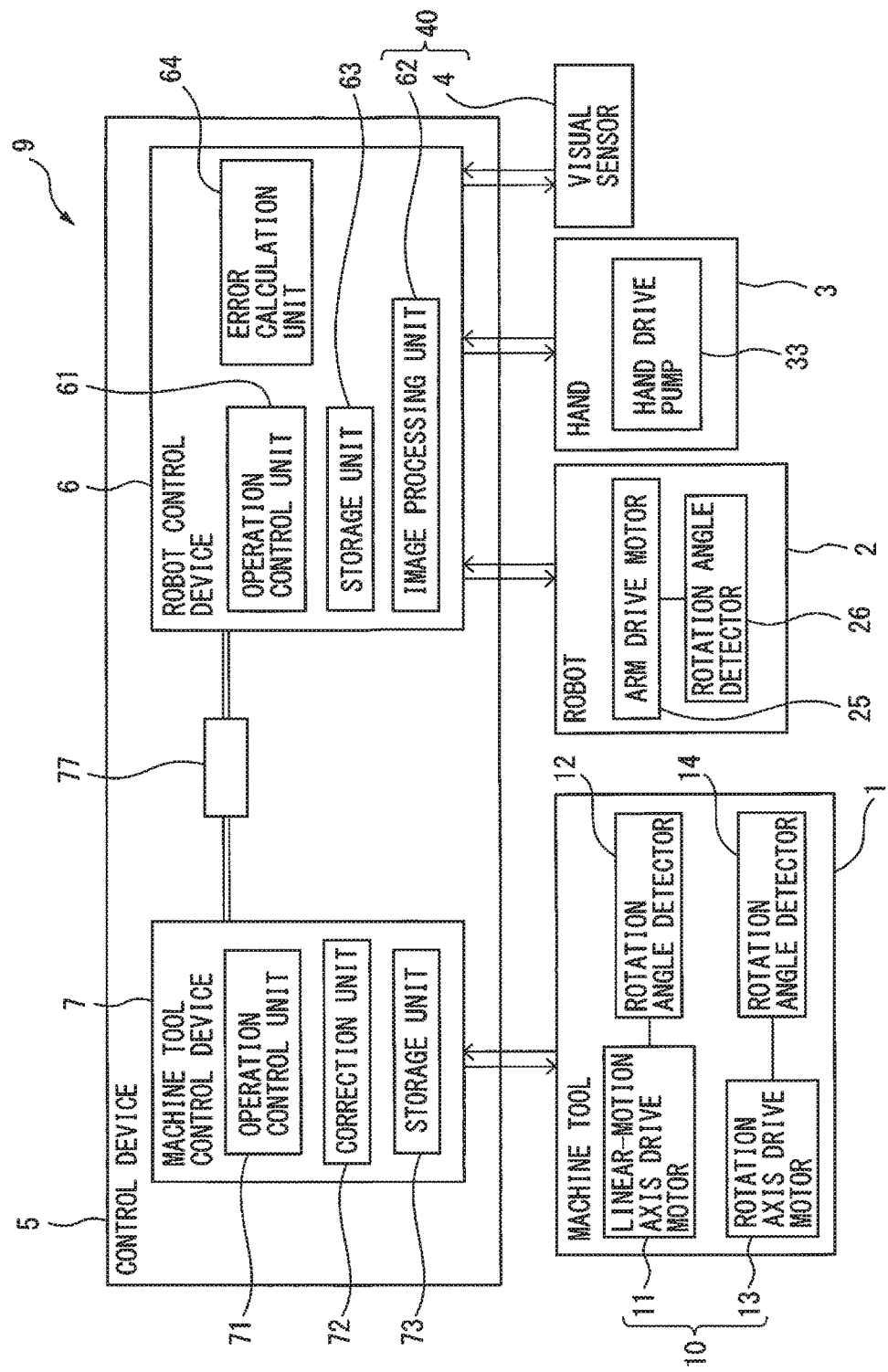
FIG. 3 is a block diagram showing the process system according to the embodiment.

FIG. 3 is a block diagram showing the process system according to the present embodiment. Referring to FIGS. 1 to 3, the machine tool 1 includes a drive device 10 that moves the tool relative to the workpiece along each feed axis. The drive device 10 includes a drive motor 11 that moves a member along the linear-motion axis. The drive device 10 of the present embodiment includes the drive motor that moves the table 16 in the X-axis direction and the drive motor that moves the table 16 in the Y-axis direction. The drive device 10 includes the drive motor that moves the spindle head 15 in the Z-axis direction. The drive device 10 includes a drive motor 13 that moves members along the rotation axis. The drive device 10 includes the drive motor 13 for the rotary table that moves the fixture 19 in the C-axis direction. The robot 2 includes an arm drive motor 25 that drives the arms 21 and the wrist part 23. The hand 3 includes a hand drive pump 33 that drives the hand.

The process system 9 of the present embodiment is provided with the conveyor 8 that transfers the workpiece 90. The conveyor 8 transfers the multiple workpieces 90 as indicated by arrow 95. The conveyor 8 transfers the workpieces 90 to a position where the hand 3 can grip the workpiece 90. The workpieces 90 of the present embodiment are placed on the conveyor 8 so as to be oriented in different directions. In other words, the workpieces 90 are transferred while being placed in irregular directions.

The process system 9 of the present embodiment includes a detection device 40 that detects a rotation angle of the workpiece 90 around a predetermined axis line when the robot 2 grips the workpiece 90. The detection device 40 of the present embodiment includes the visual sensor 4 acting as a detector that captures an image of the workpiece 90. The rotation angle of the workpiece 90 is an angle when the workpiece 90 is rotated from a predetermined orientation. The rotation angle is also referred to as a phase. In other words, the rotation angle of the workpiece 90 indicates the orientation of the workpiece 90 when the workpiece 90 rotates about the axis line. In the present embodiment, when the workpiece 90 is placed on the fixture 19, an axis line that coincides with the axis line 91 of the rotation axis of the rotary table 18 is set for the workpiece 90.

The detection device 40 detects the position of the workpiece 90 when the robot 2 grips the workpiece 90. The position of the workpiece 90 is a current relative position of the workpiece 90 with respect to a predetermined position of the workpiece 90. In the present embodiment, the position of the workpiece 90 is the relative position of the set point in the workpiece 90 with respect to a predetermined point. Moreover, in the present embodiment, a relative position of the workpiece 90 with respect to the hand 3 corresponds to the position of the workpiece 90.

The process system 9 of the present embodiment includes a control device 5 that controls the machine tool 1, the robot 2, the hand 3, and the visual sensor 4. The control device 5 of the present embodiment includes a machine tool control device 7 that controls the machine tool 1 and a robot control device 6 that controls the robot 2, the hand 3, and the visual sensor 4. The machine tool control device 7 acts as a process machine control device.

The machine tool control device 7 is composed of an arithmetic processing device (computer) that includes a central processing unit (CPU) and a random access memory (RAM) and a read-only memory (ROM) that are connected to the CPU via a bus. The robot control device 6 is composed of an arithmetic processing device that includes a CPU and the like in the same way as the machine tool control device 7. The machine tool control device 7 and the robot control device 6 are formed so as to communicate with each other through a communication apparatus 77.

The machine tool control device 7 includes an operation control unit 71 and a storage unit 73. The operation control unit 71 controls the drive motor 11 for the linear-motion axis and the drive motor 13 for the rotation axis. The storage unit 73 stores any information on machining. For example, the storage unit 73 stores a machining program for machining the workpieces 90.

The machine tool 1 includes a detector that detects the relative position of the tool 55 with respect to the workpiece 90. The detectors of the machine tool 1 according to the present embodiment include a rotation angle detector 12 that detects a rotation angle of the drive motor 11 for the linear-motion axis. The detectors of the machine tool 1 include a rotation angle detector 14 that detects a rotation angle of the drive motor 13 for the rotation axis. The machine tool control device 7 can detect the position of the table and the position of a spindle along the X-axis, the Y-axis, and the Z-axis based on the output of the rotation angle detector 12. Moreover, the rotation angle of the rotary table 18 can be detected based on the output of the rotation angle detector 14.

The robot control device 6 includes an operation control unit 61 and a storage unit 63. The operation control unit 61 controls the arm drive motor 25. The arm drive motor 25 is driven so as to change the position and the orientation of the robot 2. Furthermore, the operation control unit 61 controls the hand drive pump 33 of the hand 3. The operation control unit 61 controls the hand drive pump 33 such that the hand 3 grips or releases the workpiece 90.

Moreover, the robot control device 6 controls the visual sensor 4. The operation control unit 61 transmits a command for capturing an image to the visual sensor 4 and receives the image captured by the visual sensor 4. The storage unit 63 stores any information on the control of the robot 2, the hand 3, and the visual sensor 4. For example, the storage unit 63 stores an operation program for operating the robot 2, the hand 3, and the visual sensor 4, information detected by the detector, and information calculated by the robot control device 6.

The robot 2 includes a detector that detects the position and the orientation of the robot 2. The detector of the robot 2 according to the present embodiment includes a rotation angle detector 26 that detects the rotation angle of the arm drive motor 25. The rotation angle detector 26 can be comprised of an encoder. The robot control device 6 can detect the position and the orientation of the robot 2 based on the output of the rotation angle detector 26. Moreover, the rotation angle of the wrist part 23 is detected based on the output of the rotation angle detector 26. For example, the suction pad that faces downward can be detected from the two suction pads 35 of the hand 3 based on the output of the rotation angle detector 26.

The visual sensor may be controlled by the machine tool control device. Furthermore, the control device may include a control device that controls the visual sensor.

In this case, the control device that controls the visual sensor can be formed so as to communicate with the robot control device and the machine tool control device.

Referring to FIG. 1, the workpieces 90 are transferred by the conveyor 8 in the process system 9 of the present embodiment. The position and the orientation of the robot 2 are changed so as to change the positions and orientations of the arms 21. After that, the first suction pad 35 of the hand 3 grips the workpiece 90.

Figure 4:
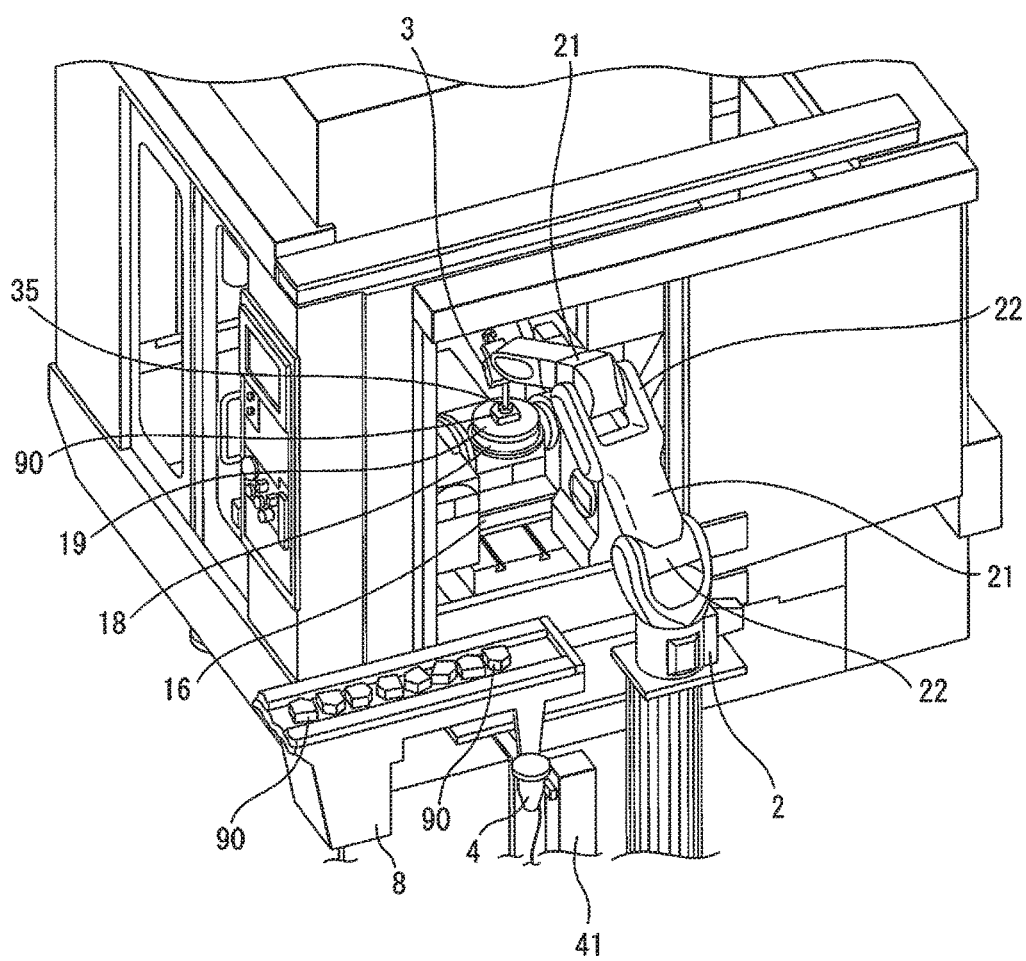
FIG. 4 is a perspective view showing the machine tool and a robot according to the embodiment.

FIG. 4 is a perspective view showing that the robot has placed the workpiece on the fixture of the machine tool. Referring to FIGS. 2 and 4, the hand 3 grips the workpiece 90 before machining, and then the position and the orientation of the robot 2 are changed so as to bring the workpiece 90 into the machining room of the machine tool 1. When the machined workpiece 90 is placed on the fixture 19, the hand 3 grips the machined workpiece 90 with the second suction pad 35. After that, the position and the orientation of the robot 2 are changed so as to place the workpiece 90 before machining that is gripped by the first suction pad 35 into the recess portion 20 formed on the fixture 19.

Subsequently, the hand 3 releases the workpiece 90 before machining. The position and the orientation of the robot 2 are changed such that the robot 2 is retracted from the inside of the machining room. The robot 2 transfers the machined workpiece 90 to a predetermined position.

Figure 5:
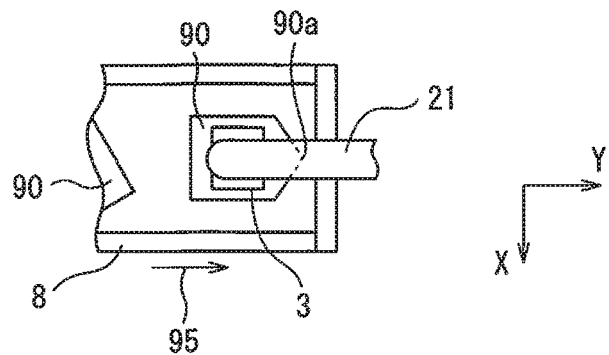
FIG. 5 is a schematic plan view showing first step in the control of a comparative example where a workpiece is transferred to a machine tool.
Figure 6:
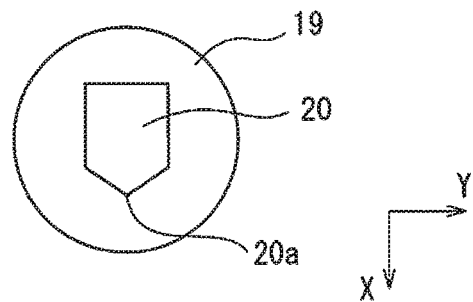
FIG. 6 is a schematic plan view showing second step in the control of the comparative example where the workpiece is transferred to the machine tool.
Figure 7:
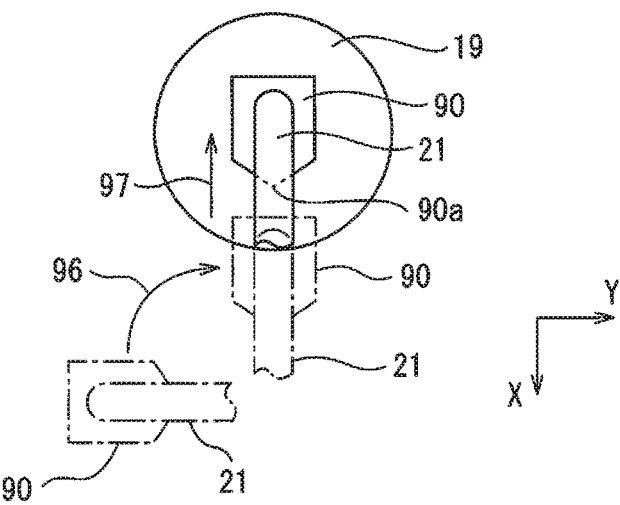
FIG. 7 is a schematic plan view showing third step in the control of the comparative example where the workpiece is transferred to the machine tool.

FIGS. 5 to 7 are explanatory drawings showing the control of a comparison example in which the workpiece transferred by the conveyor is placed on the fixture. FIG. 5 is a schematic plan view showing first step in the control of the comparative example. The workpiece 90 of the present embodiment has pentagonal shape in a plan view. The workpiece 90 does not have a point-symmetric shape and has an orientation. The workpiece 90 needs to be fixed to the fixture 19 in a predetermined orientation relative to the fixture 19.

The workpieces 90 are transferred in various orientations in plan view. In the example of FIG. 5, the workpiece 90 gripped by the robot 2 has a top portion 90a that is oriented in the traveling direction of the conveyor 8 as indicated by the arrow 95. The hand 3 grips the workpiece 90. The position and the orientation of the robot 2 that grips the workpiece 90 with the hand 3 are determined beforehand by the operation program. The robot 2 is driven so as to transfer the workpiece 90 into the machining room.

FIG. 6 is a schematic plan view showing second step in the control of the comparative example. FIG. 6 is a schematic plan view showing the fixture 19 disposed in the machining room of the machine tool 1. The recess portion 20 has a top portion 20a that corresponds to the top portion 90a of the workpiece 90. In the example of FIG. 6, the top portion 20a is directed to the positive side of the X-axis. The position of the table 16 and the rotation angle of the rotary table 18 at this point are predetermined by the machining program.

FIG. 7 is a schematic plan view showing third step in the control of the comparative example. FIG. 7 is a schematic plan view when the workpiece 90 is disposed on the fixture 19. The arm 21 of the robot 2 is pivoted as indicated by arrow 96. In this example, the robot 2 pivots by 90° from the position and the orientation for gripping the workpiece 90. At this time, the orientation of the top part 20a of the recess portion 20 is matched to the orientation of the top portion 90a of the workpiece 90. Thus, the robot 2 can move the workpiece 90 as indicated by arrow 97 and place the workpiece 90 into the recess portion 20. The position and the orientation of the robot 2 at this time are predetermined in the operation program.

In the present embodiment, a reference rotation angle as a criterion for the rotation angle of the workpiece and a reference position as a criterion for the reference position of the workpiece are determined in advance. The reference rotation angle and the reference position are stored in the storage unit 63 of the robot control device 6. If the workpiece 90 can be placed in a desired region without correcting the position of the workpiece 90 as the comparative example, the position of the workpiece relative to the hand is the reference position. Furthermore, if the workpiece can be placed in a desired region without correcting the rotation angle of the workpiece 90, the rotation angle of the workpiece relative to the hand is the reference rotation angle. If the hand 3 grips the workpiece 90 at the reference position and the reference rotation angle, the robot 2 can transfer the workpiece 90 at the position and in the orientation according to the operation program. However, the position and the rotation angle of the workpiece 90 of the present embodiment are deviated from the reference position and the reference rotation angle.

Figure 8:
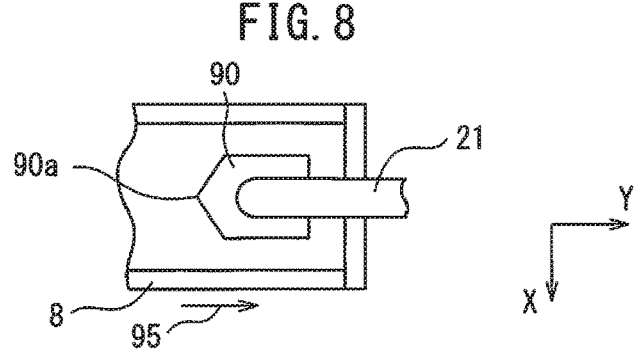
FIG. 8 is a schematic plan view showing first step in the control of the embodiment.
Figure 9:
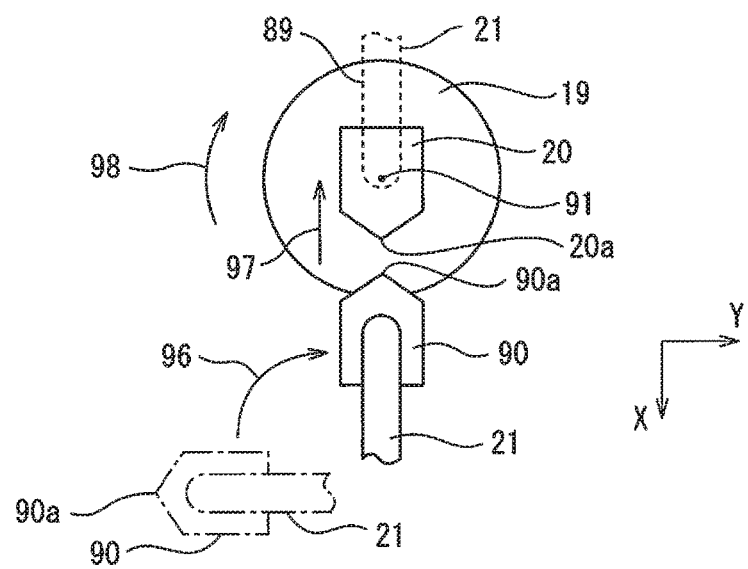
FIG. 9 is a schematic plan view showing second step in the control of the embodiment.
Figure 10:
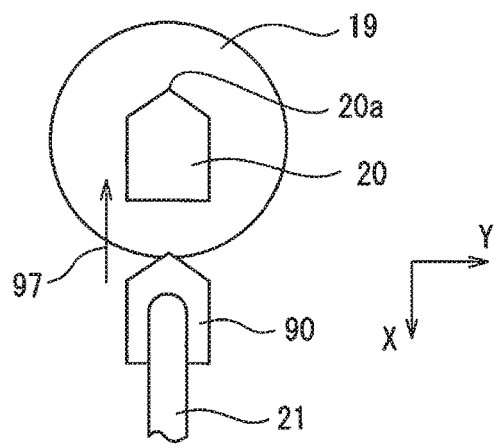
FIG. 10 is a schematic plan view showing third step in the control of the embodiment.

FIGS. 8 to 10 are explanatory drawings that shows the control when the workpiece transferred by the conveyor is placed on the fixture according to the present embodiment. First, the workpiece at a rotation angle (phase) deviated from the reference rotation angle will be described below.

FIG. 8 is an explanatory drawing showing first step in the control of the present embodiment. FIG. 8 is a schematic plan view when the robot 2 grips the workpiece 90 after the workpiece is conveyed by the conveyor 8. The top portion 90a of the workpiece 90 is oriented opposite to the transfer direction (the direction of arrow 95) of the workpiece 90 on the conveyor 8.

FIG. 9 is an explanatory drawing showing second step in the control of the present embodiment. FIG. 9 is a schematic plan view when the robot 2 transfers the workpiece 90 into the machining room of the machine tool 1. The robot 2 pivots as indicated by arrow 96 in the same way as the comparative example, whereby the workpiece 90 can be transferred to the vicinity of the fixture 19. However, the orientation of the top portion 90a of the workpiece 90 is different from the orientation of the top part 20a of the recess portion 20 on the fixture 19. Even if the workpiece 90 is moved as indicated by the arrow 97, the workpiece 90 cannot be placed in the recess portion 20.

In order to place the workpiece 90 in the recess portion 20, the arm 21 of the robot 2 needs to be moved to position 89. However, the arm 21 at position 89 extends to the inside of the machining room. The orientation of the arm 21 exceeds the range of motion of the robot 2. Moreover, when the robot 2 is driven, the component of the robot 2 such as the arm 21 may come into contact with the component of the machine tool 1. In other words, when the robot 2 is driven, the robot 2 may interfere with the machine tool 1.

In the process system 9 of the present embodiment, the machine tool control device 7 of the machine tool 1 rotates the rotary table 18, whereby the region for placing the workpiece 90 coincides with the orientation of the workpiece 90 that is transferred by the robot 2. In other words, the rotary table 18 corrects the rotation angle of the fixture 19. As indicated by arrow 98, the rotary table 18 rotates the fixture 19 so as to match the orientation of the recess portion 20 to the orientation of the workpiece 90 transferred by the robot 2.

FIG. 10 is an explanatory drawing showing third step in the control of the present embodiment. FIG. 10 is a schematic plan view showing the fixture 19 and the workpiece 90 after the fixture 19 is rotated. The rotary table 18 is rotated by 180° so as to match the orientation of the recess portion 20 to the orientation of the workpiece 90 transferred by the robot 2. In this state, the robot 2 moves the workpiece 90 as indicated by arrow 97, and can place the workpiece 90 in the recess portion 20.

As described above, in the process system 9 of the present embodiment, in the event of an error of the rotation angle of the workpiece 90 around the predetermined axis line when the robot 2 grips the workpiece 90, the error of the rotation angle is corrected in the machine tool 1. In the present embodiment, an error (deviation amount) of the rotation angle is referred to as a rotation error. Control for correcting the rotation angle of the fixture 19 will be described below.

Referring to FIGS. 1 to 3, the robot control device 6 includes an image processing unit 62 that processes the image acquired by the visual sensor 4. After the hand 3 grips the workpiece 90, the robot 2 places the workpiece 90 in a range where the image can be captured by the visual sensor 4. In the present embodiment, the robot 2 places the workpiece 90 above the visual sensor 4. The position and the orientation of the robot 2 at this time are predetermined in the operation program. The visual sensor 4 of the present embodiment captures an image of the bottom face of the workpiece 90.

Figure 11:
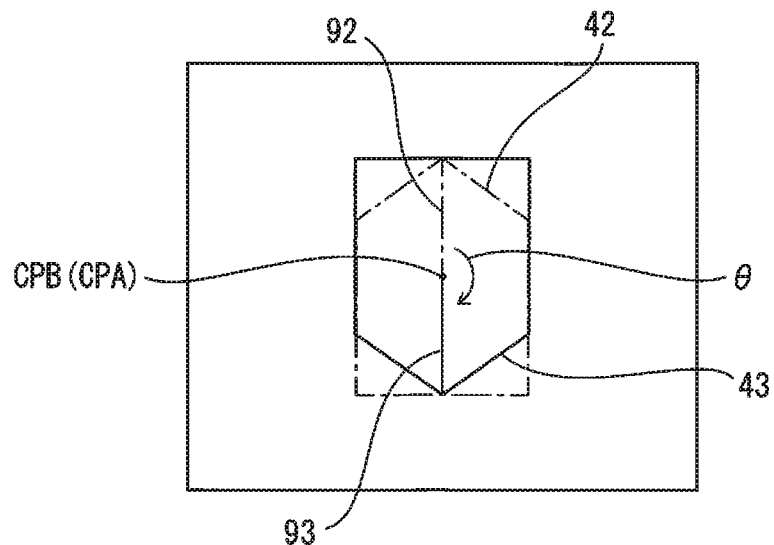
FIG. 11 shows an image for explaining a correction of the rotation angle of the workpiece.

FIG. 11 shows an example of an image obtained by processing an output from the visual sensor in the image processing unit. Referring to FIGS. 3 and 11, the storage unit 63 stores a reference image 42 of the workpiece 90 when the robot 2 grips the workpiece 90. The reference image 42 is an image that is obtained when the hand 3 grips the workpiece 90 at the reference position and the reference rotation angle. Furthermore, the reference image 42 is an image that is obtained in the absence of the error in the position and the rotation angle of the workpiece. The image processing unit 62 processes a captured image of the workpiece 90 so as to allow detection of the rotation angle of the workpiece 90. The image processing unit 62 of the present embodiment can detect the outline of the workpiece 90. If the image captured by the visual sensor 4 coincides with the reference image 42, the correction amount is 0 for the rotation angle of the workpiece 90. The reference image 42 has a predetermined set point CPB. The set point CPB of the present embodiment is the set at the position of the axis line 91 of the C-axis when the workpiece 90 is placed in the recess portion 20. The position of the set point CPB corresponds to the reference position serving as the criterion for the position of the workpiece 90.

Moreover, the reference image 42 of the workpiece 90 has an auxiliary line 92 for detecting the rotation angle of the workpiece 90. The auxiliary line 92 of the present embodiment is the line in which the set point CPB and the top portion of the workpiece are connected. The reference rotation angle of the reference image 42 is 0°. The image processing unit 62 calculates a set point CPA and an auxiliary line 93 in an actually captured image 43 of the workpiece. In the example of FIG. 11, the set point CPB of the reference image 42 coincides with the set point CPA of the actually captured image 43 of the workpiece. The rotation angle of the workpiece 90 is a rotation angle around the set point CPA. The set point and the auxiliary line can be arbitrarily set.

The robot control device 6 includes an error calculation unit 64 that calculates an error of the rotation angle of the workpiece 90 relative to the reference rotation angle. In other words, the error calculation unit 64 calculates a rotation error. In the present embodiment, an angle θ formed by the auxiliary line 93 in the actually captured image 43 of the workpiece and the auxiliary line 92 in the reference image 42 corresponds to the error of the rotation angle. In the example of FIG. 11, the error calculation unit 64 detects +180° as the angle θ of the rotation error. A deviation amount of the rotation angle of the workpiece 90 corresponds to a correction amount of each axis when the machine tool 1 is driven. The robot control device 6 transmits the rotation error calculated by the error calculation unit 64 to the machine tool control device 7.

When the robot 2 transfers the workpiece 90 to the fixture 19, the machine tool control device 7 corrects the rotation angle of the fixture 19 based on the rotation error so as to correspond to the rotation angle of the workpiece 90 detected by the detection device 40. The machine tool control device 7 includes a correction unit 72 that corrects the predetermined position of each axis. The initial reference position of each axis is predetermined in the machining program. The correction unit 72 calculates the correction amount of a coordinate value in a coordinate system in the machine tool 1 based on the rotation error of the workpiece 90 that is received from the robot control device 6. In other words, the correction unit 72 calculates a correction amount for each axis.

In this example, the machine tool control device 7 performs the correction for rotating by +180° along the C-axis. The operation control unit 71 corrects the rotation angle of the fixture 19 based on the correction amount of the C-axis. Referring to FIG. 9, as indicated by arrow 98, the operation control unit 71 causes the rotary table 18 to rotate the fixture 19 by +180°. This control can match, as shown in FIG. 10, the orientation of the workpiece 90 to the orientation of the region for placing the workpiece 90.

In the above examples, the control for correcting the rotation error of the workpiece 90 when the hand 3 grips the workpiece 90 is explained. When the hand 3 grips the workpiece 90, the position of the workpiece 90 may be displaced relative to the hand 3. For example, the robot 2 grips the workpiece 90 that is transferred by the conveyor 8 based on the operation program. At this time, the hand 3 may not grip the workpiece 90 at a predetermined position. The process system 9 of the present embodiment can correct the displacement of the position of the workpiece 90 in the same way as the deviation of the rotation angle.

Figure 12:
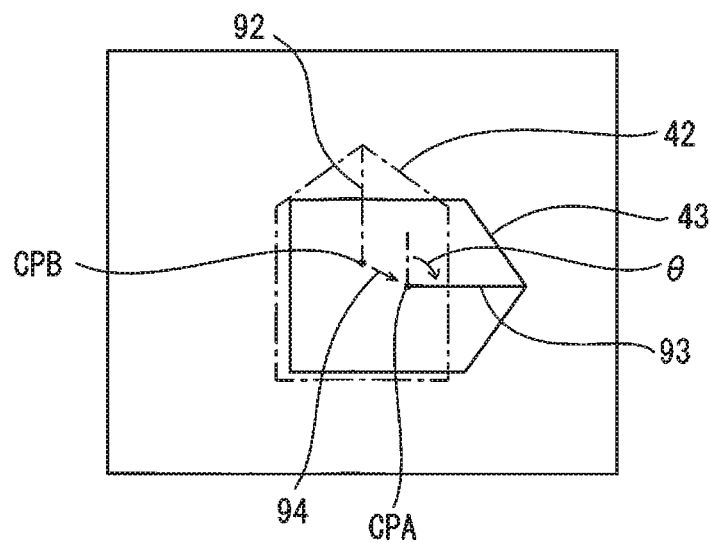
FIG. 12 shows an image for explaining corrections of the position and the rotation angle of the workpiece.

FIG. 12 shows another image captured by the visual sensor. Referring to FIGS. 12 and 3, the set point CPA of the workpiece 90 in the image 43 that is captured by the visual sensor 4 is deviated from the set point CPB in the reference image 42. The error calculation unit 64 detects the position of the set point CPA of the workpiece 90 based on the output of the visual sensor 4. The position of the set point CPB in the reference image 42 corresponds to the reference position of the workpiece 90. The error calculation unit 64 detects the rotation angle of the workpiece 90. The error calculation unit 64 calculates an error of the position of the workpiece 90 relative to the reference position. When the robot 2 grips the workpiece 90 in the present embodiment, an error of the position of the workpiece 90 is referred to as a position error. As indicated by arrow 94, the error calculation unit 64 calculates the position error for the set point CPA in the image of the workpiece 90 relative to the set point CPB. Moreover, the error calculation unit 64 calculates an angle θ serving as a rotation error. The robot control device 6 transmits the position error and the rotation error, which are calculated by the error calculation unit 64, to the machine tool control device 7.

The correction unit 72 of the machine tool control device 7 calculates a correction amount for each axis of the machine tool 1 based on the received position error and rotation error. For example, the correction unit 72 calculates the correction amount at the position in the X-axis direction and the Y-axis direction of the table 16 based on the position error. Moreover, the correction unit 72 calculates the correction amount of the rotation angle of the rotary table 18 based on the rotation error. The operation control unit 71 corrects the position and the rotation angle of the rotary table 18. When the robot 2 transfers the workpiece 90 to the fixture 19, the operation control unit 71 corrects, based on the error calculated by the error calculation unit 64, the position and the rotation angle of the fixture 19 so as to correspond to the position and the rotation angle of the workpiece 90 detected by the detection device.

As described above, the machine tool control device 7 can correct the initial position and the initial rotation angle of the fixture 19, which is set in the machining program. As shown in FIG. 5, if the deviation amount of the position and the rotation angle of the workpiece 90 is 0, the correction amount of the position and the rotation angle is 0.

In the process system 9 of the present embodiment, the machine tool 1 can correct the deviation of the rotation angle when the robot 2 grips the workpiece 90. It is not necessary to arrange the phase-matching device and the temporary placement table, thereby the configuration of the process system is simplified. Moreover, it is not necessary to adjust the phase in the phase-matching device or grip the workpiece again in the temporary placement table, thereby the workpiece 90 can be transferred to the machine tool 1 in a short time. Furthermore, in the process system 9 of the present embodiment, the machine tool 1 can correct a displacement when the robot 2 grips the workpiece 90. Additionally, the operations of the rotary table 18 and the like are changed in the machine tool 1 so as to reduce the operation of the robot 2, thereby safety is improved. For example, when the robot 2 operates, the robot 2 can be prevented from coming into contact with the operator.

One of the rotation error and the position error may be corrected by the robot. For example, the rotary table rotates the fixture so as to correct the rotation error in the machine tool while the robot may correct the position error. In this case, based on the calculated position error, the robot control device can correct the position and the orientation of the robot when the workpiece is transferred to the fixture.

The detection device 40 that detects the rotation angle of the workpiece 90 according to the present embodiment includes the visual sensor 4. By adopting this configuration, the deviation amount of the rotation angle and the displacement amount of the position of the workpiece 90 can be detected without coming into contact with the workpiece 90. Moreover, the deviation amount of the rotation angle and the displacement amount of the position of the workpiece 90 can be detected in a short time. The detection device 40 is not limited to this configuration. The detection device 40 can be any device that can detect the rotation angle of a workpiece around the predetermined axis line and the position of the workpiece. For example, the detection device can include a probe with a tip that comes into contact with the workpiece so as to detect the shape of the workpiece.

The machine tool 1 of the present embodiment includes two linear-motion axes for moving the fixture 19 linearly and a rotation axis for rotating the fixture 19. This configuration allows the machine tool 1 to correct the rotation error and the position error of the workpiece 90. The machine tool is not limited to this configuration. The machine tool may include at least three linear-motion axes for moving the fixture linearly and at least two rotation axes for rotating the fixture.

The workpiece 90 of the present embodiment has a flat grip surface to be gripped by the hand 3. Thus, the hand can grip the workpiece 90 at a certain inclination. However, when the workpiece is gripped by the end effector, the inclination of the workpiece may be changed depending on the kind of the end effector and the kind of the workpiece.

Referring to FIGS. 2 and 3, the machine tool 1 of the present embodiment has an A-axis that allows the rotary table 18 to swing. The machine tool 1 includes the support member 17 that supports the rotary table 18 so as to swing the rotary table 18. The rotary table 18 swings along the A-axis. In this way, the machine tool 1 of the present embodiment has the two rotation axes. The drive device 10 includes the drive motor 13 that rotates the fixture 19 in the direction of the A-axis. The operation control unit 71 controls the drive motor 13 that corresponds to the A-axis. The rotary table 18 swings so as to change the orientation (inclination) of the fixture 19 that is fixed to the rotary table 18.

Moreover, a three-dimensional visual sensor can be disposed as the visual sensor 4. Various noncontact visual sensors can be used as the three-dimensional visual sensor. For example, the three-dimensional visual sensor may have a stereophonic system with two cameras, a system for scanning laser slit light, or a system for projecting pattern light to an article by a projector.

The image processing unit 62 of the robot control device 6 can detect the orientation (inclination) of the workpiece 90 in addition to the shape of the workpiece 90. The image processing unit 62 can detect the orientation of the workpiece 90 based on an image acquired by the three-dimensional visual sensor. The workpiece 90 can have a predetermined axis line of another rotation axis corresponding to the A-axis of the machine tool 1. The storage unit 63 can stored a predetermined reference rotation angle for the A-axis. The robot control device 6 can detect a rotation angle on another rotation axis. The error calculation unit 64 can calculate a rotation error in another rotation axis.

The correction unit 72 of the machine tool control device 7 calculates a correction amount of the coordinate value of the workpiece 90 in the machine tool 1 based on the rotation error in another rotation axis when the workpiece 90 is transferred to the machine tool 1. The correction unit 72 can calculate the correction amount of a rotation angle of the A-axis. The operation control unit 71 can correct the orientation of the fixture 19 based on the correction amount.

As described above, the orientation of the fixture 19 in the machine tool 1 is corrected so as to correct a deviation of the orientation of the workpiece 90 when the robot 2 grips the workpiece 90. Also if the inclination of the workpiece is changed at the time when the end effector grips the workpiece, the orientation of the workpiece can be corrected by using the three-dimensional visual sensor and the machine tool including at least two rotation axes.

In the control device 5 of the present embodiment, the robot control device 6 includes the image processing unit 62 and the error calculation unit 64. The present invention is not limited to this configuration. At least one of the image processing unit and the error calculation unit may be disposed in the machine tool control device. Alternatively, a single control device may be disposed so as to control the machine tool, the robot, the hand, and the visual sensor.

The conveyor 8 of the present embodiment transfers the workpieces 90 that are oriented in various directions. The present invention is not limited to this configuration. The workpieces may be transferred so as to be oriented in the same direction. The control of the present embodiment is applicable when the workpieces transferred by the conveyor are oriented in the same direction. Also in this case, the rotation angle and the position of the workpiece are deviated when the robot grips the workpiece. By adopting the control of the present embodiment, the displacement of the workpiece that occurs when the robot grips the workpiece can be corrected.

The process machine of the present embodiment is the machine tool. The present invention is not limited to this configuration. The process machine may be any process machine that can process the workpiece and rotate the workpiece. For example, the control of the present embodiment is applicable to a laser machine such as a laser beam welding machine and a laser beam cutting machine. Furthermore, the control of the present embodiment is applicable to a process machine that has at least one rotation axis.

An aspect of the present disclosure can provide the process system that corrects the rotation angle of the workpiece when the robot transfers the workpiece to the process machine.

The foregoing embodiment can be suitably combined. In the drawings, the same or similar parts are indicated by the same reference symbols. The foregoing embodiment is exemplary and does not limit the present invention. Moreover, the foregoing embodiment includes a change of the embodiment within the scope of claims.

The invention claimed is:

1. A process system comprising:
a process machine including a fixture where a workpiece is fixed;
a robot that transfers the workpiece to the fixture;
a control device that controls the process machine and the robot; and
a detection device that detects a rotation angle of the workpiece around a predetermined axis line when the robot grips the workpiece, wherein
the process machine includes a drive device that rotates the fixture,
the control device includes a storage unit that stores a reference rotation angle serving as a criterion of a rotation angle of the workpiece, and an error calculation unit that calculates a rotation error relative to the reference rotation angle in the rotation angle of the workpiece detected by the detection device, and
the control device corrects the rotation angle of the fixture based on the rotation error so as to correspond to the rotation angle of the workpiece detected by the detection device when the robot transfers the workpiece to the fixture.

2. The process system according to claim 1, wherein the detection device includes a visual sensor that captures an image of the workpiece.

3. The process system according to claim 2, wherein the visual sensor is a three-dimensional visual sensor.

4. The process system according to claim 1, wherein
the detection device detects a position of the workpiece when the robot grips the workpiece,
the storage unit stores a reference position as a criterion for the position of the workpiece, the error calculation unit calculates a position error relative to the reference position in the position of the workpiece detected by the detection device, and the control device corrects a position of the fixture based on the position error so as to correspond to the position of the workpiece detected by the detection device when the robot transfers the workpiece to the fixture.

5. The process system according to claim 4, wherein the process machine includes at least two linear-motion axes for linearly moving the fixture, and at least one rotation axis for rotating the fixture.

6. The process system according to claim 1, wherein the control device includes a process machine control device that controls the process machine, a robot control device that controls the robot, and a communication apparatus that carries out communications between the process machine control device and the robot control device, and the robot control device includes the storage unit and the error calculation unit.

* * * * *